Sept. 27, 1938.　　　　R. L. NOBLE　　　　2,131,667
DRAFT EQUALIZER
Filed May 24, 1937　　　　2 Sheets-Sheet 1
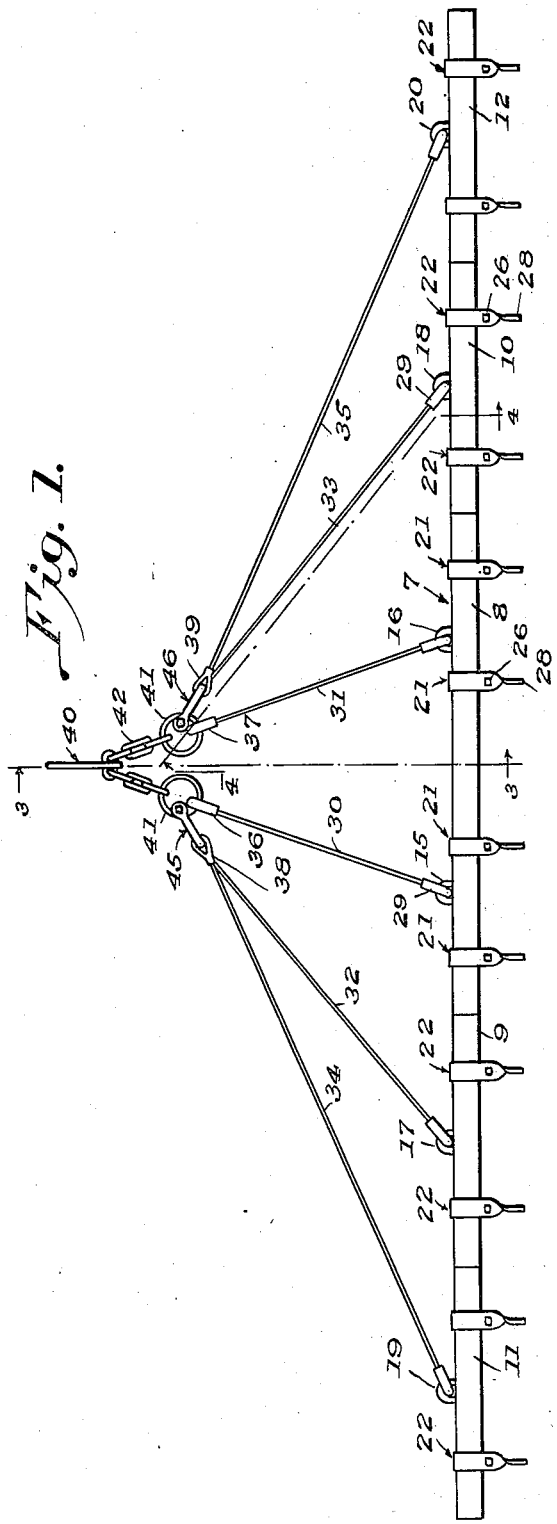
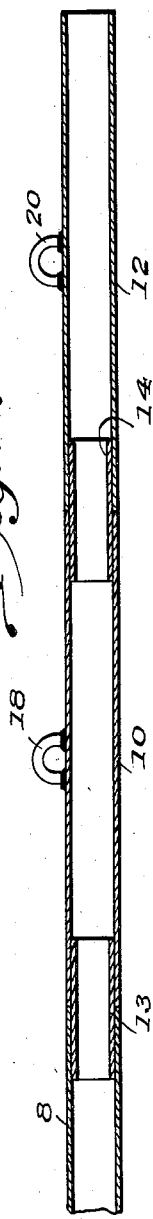
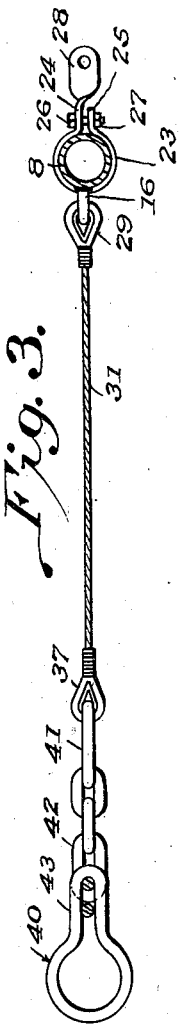
Inventor
Roy L. Noble
Kimmel & Crowell
Attorneys Sept. 27, 1938.   R. L. NOBLE   2,131,667
DRAFT EQUALIZER
Filed May 24, 1937   2 Sheets-Sheet 2
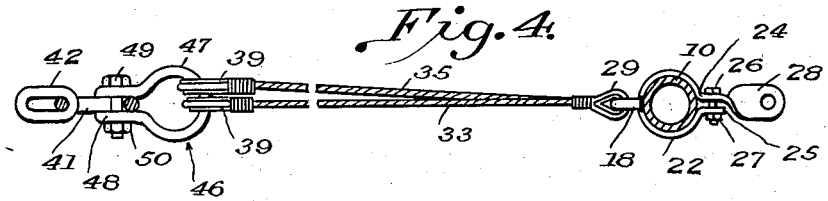
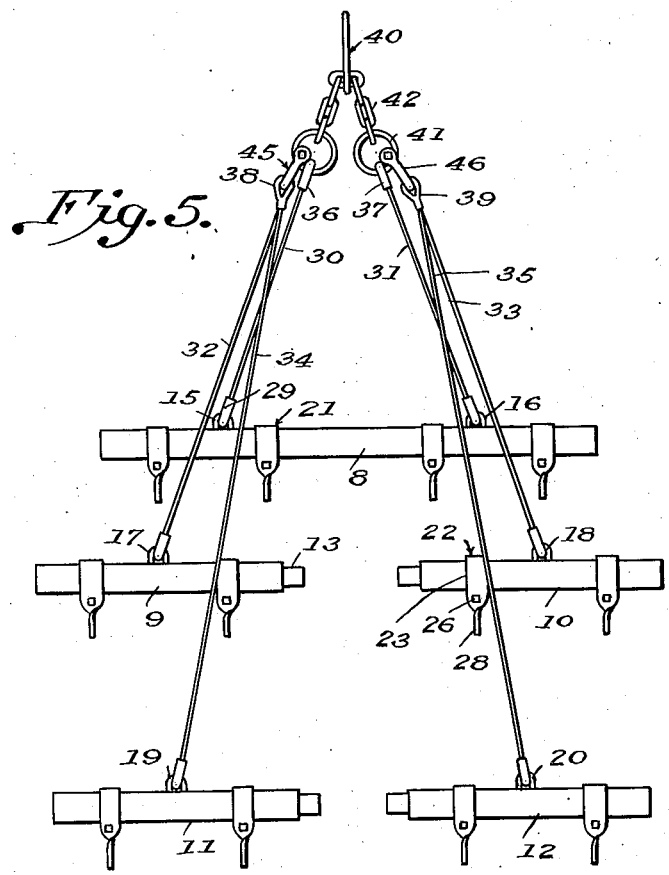
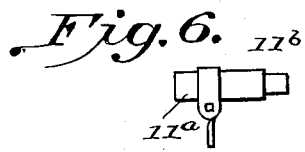
Inventor
Roy L. Noble
By Kimmel & Crowell
Attorneys Patented Sept. 27, 1938

2,131,667

UNITED STATES PATENT OFFICE 2,131,667

DRAFT EQUALIZER

Roy L. Noble, Sac City, Iowa

Application May 24, 1937, Serial No. 144,518

4 Claims. (Cl. 55—84)

My invention relates to an improvement in a draft equalizer, more particularly upon the construction of the device disclosed by Letters Patent 1,453,886, granted to me May 1, 1923, and has for its object to provide, in a manner as hereinafter set forth a draft equalizer of materially increased efficiency and utility with respect to the structure as set forth by the Letters Patent aforesaid.

A further object of the invention is to provide, in a manner as hereinafter set forth, a draft equalizer including a sectional draw bar or evener element capable of having its length reduced when occasion requires and with the sections of the bar having means extended therefrom to a common coupling structure therefor employed for attaching the sections of the bar with a traction means.

A further object of the invention is to provide, in a manner as hereinafter set forth, a draft equalizer including a sectional draw bar structure capable of having the sections thereof arranged in tandemwise relation for passage through a gate when the equalizer is attached with a traction means.

A further object of the invention is to provide, in a manner as hereinafter set forth, a draft equalizer including a draw bar structure capable of having its length varied.

A further object of the invention is to provide, in a manner as hereinafter set forth, a draft equalizer including a draw bar structure capable of being folded when occasion requires.

Further objects of the invention are to provide, in a manner as hereinafter set forth, a draft equalizer which is comparatively simple in its construction and arrangement, strong, durable, compact, thoroughly efficient in its use, conveniently adjusted when occasion requires, comparatively inexpensive to manufacture, and capable of being arranged in a compact manner when not in use.

To the above ends essentially and to others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention as claimed.

In the drawings:

Figure 1 is a top plan view of the equalizer,

Figure 2 is a fragmentary view in longitudinal section of the draw bar or evener element, Figure 3 is a section on line 3—3, Figure 1.

Figure 4 is a section, broken away, on line 4—4, Figure 1,

Figure 5 is a top plan view of the equalizer, when folded, and

Figure 6 is a detail in plan of the form of the attachments for the draw bar when the outer sections of said bar are removed.

The equalizer includes a draw bar or evener element generally indicated at 7 and formed of a series of endwise aligned interengaging tubular separable sections. The bar 7 may be formed of the desirable number of sections, preferably by way of example five, designated 8, 9, 10, 11 and 12. The section 8 is the central section, the sections 9, 10 the intermediate sections and the sections 11, 12 the outer sections. The sections 9, 10 are of like form, but oppositely disposed and each has welded or otherwise secured therein and extended from the inner end thereof a combined coupling and supporting sleeve 13. The sleeves 13 removably extend into the opposite ends of the section 8 and act to couple the latter to the sections 9, 10, as well as support section 8 from sections 9, 10. The sections 11, 12 are of like form and each has welded or otherwise secured therein and extending from the inner end thereof a combined coupling and supporting sleeve 14. The sleeves 14 extend into the outer ends of the sections 9, 10 and act to couple these latter to the sections 11, 12 as well as to support sections 9, 10 from sections 11, 12. Preferably the several sleeves will be of an outer diameter to frictionally engage the inner faces of those sections into which the sleeves extend. The section 8 will be of the desired length and preferably of a length equal to the combined length of sections 9, 10 or sections 11, 12.

The section 8 has formed integral with its forward side, between its vertical median and its ends the forwardly extended eyes 15, 16. The sections 9, 10, 11, 12 have formed integral with their forward sides centrally thereof the forwardly extended eyes 17, 18, 19, 20 respectively. The section 8 has connected thereto a set of four spaced adjustable clamps 21 and each of the other sections has connected thereto a pair of spaced adjustable clamps 22. The clamps 21, 22 are of like form and each consists of a split band 23 formed with a pair of rearwardly disposed apertured ears 24, 25 at its split ends, a securing bolt 26 extending through the ears 24, 25, a nut 27 carried by the bolt and a torsional twisted apertured arm 28 integral with and extending rearwardly from ear 24. The arms 28 of the clamps 21, 22 are adapted to be coupled with the harrow or other device with which the equalizer is employed.

Attached to the eyes 15, 16, 17, 18, 19, 20 are the looped rear ends 29 of the flexible pull members 30, 31, 32, 33, 34, 35 respectively. The members 30, 31, 32 are disposed at an opposite inclination to that of the members 33, 34, 35. The members 30, 31, 32 extend inwardly from their loops 29 towards one side of the vertical median of section 8. The members 33, 34, 35 extend inwardly from their loops 29 towards the other side of the vertical median of section 8. The forward ends of the members 30, 31 are of loop form as indicated at 36, 37 respectively. The forward ends of the members 32, 34 are of loop-like form as indicated at 38. The forward ends of the members 33, 35 are of loop-like form as indicated at 39. The looped ends 36, 37 of members 30, 31 are permanently attached to coupler rings 40, 41 respectively carried by the ends of a rearwardly extended bent chain 42 which extends through the reduced rear portion 43 of a skeleton endless clevis 44 for attachment to a traction means not shown. Removably connected to the coupler rings 40, 41 are coupling devices 45, 46 respectively of like form and each consists of an annular split body part 47 and a pair of inset parallel spaced arms 48 having aligned openings for the passage of a bolt 49 carrying a securing nut 50. The bolt 49 of device 45 extends through the ring 40. The bolt 49 of the device 46 extends through the ring 41. The coupling device 45 provides for removably connecting the looped forward ends 38 of the members 32, 34 with the ring 40. The coupling device 46 provides for removably connecting the looped forward ends 39 with the ring 41.

The length of the bar 7 may be decreased by removing one or both of the sections 11, 12, or the sections 9, 11, or the sections 8, 12 from the section 8. When one or both intermediate sections or one or both of the outer sections are detached from section 8 to decrease the length of the latter, the pull or pull members respectively associated with a detached section or detached sections is or are removed from a coupler device. The construction of the coupling devices provide whereby the pull members 32, 33, 34, 35 may be removed therefrom. When the sections 32, 33, 34, 35 are folded relatively to each other and also in relation to section 8 so as to form a tandem-wise-like arrangement, such as shown in Figure 5 to enable the equalizers passing through a gate or other opening, the pull members 32, 33, 34, 35 are not disconnected from the coupling devices 45, 46, but they are disposed over section 8 and with the pull members 33, 35 disposed over sections 9, 10.

The clevis 44, chain 42 and rings 40, 41 are termed a coupling structure for attaching the equalizer to a traction means for the latter.

The pull members are arranged in a central pair, an intermediate pair and an outer pair. The members forming the central pair are designated at 30, 31 and are of less length than the members 32, 33 which form the intermediate pair. The members 32, 33 are of less length than the members 34, 35 which form the outer pair.

Although the pull members are shown as formed of cables, yet chains may be substituted therefor, but with each chain having a loop forming means at each of its ends.

The device as shown in Figure 1 is employed for use in connection with six harrows, each harrow being coupled with the equalizer by a pair of clamping devices 21 or a pair of clamping devices 22. If it be desired to use the equalizer with five harrows instead of six the sections 11, 12 are removed, and a pair of attachments 11a such as shown in Figure 6 will be employed and connected at the outer ends of sections 9, 10. Each attachment includes but a single clamping device 11b which associates with a clamping device 22 on section 9 or with a clamping device 22 on section 10. When sections 11 and 12 are removed, pull members 34, 35 are disconnected from the clamping devices 45, 46. The attachment 11a will be of the same form as the sections 9, 10, 11, 12 of the draw bar, with this exception that it is of less length and provided with a single clamping device.

What I claim is:

1. In a draft equalizer, a lengthwise adjustable draw bar formed of a central section and a set of outer sections extending from each end of the central section, the sections of each of said sets being of like length, said central section being of greater length than the other sections, the sections of said sets having coupling means extending laterally from the inner ends thereof for detachably connecting all of the sections of said bar together and for supporting them in endwise alignment, the coupling means of an outer section of the bar interengaging with an inner section, a forwardly directed eye disposed centrally of each section of each set, a pair of spaced forwardly directed eyes disposed on said central section and equally spaced from the transverse median and ends of such section, a pair of pull members attached to the eyes of said central section, a pull member attached to the eyes of each of the sections of each set, a pair of spaced rings, each having a pull member of said central section attached thereto, means for detachably connecting the forward ends of the pull members of a set to one of said rings, a skeleton clevis having a reduced portion, a link chain having one of its links mounted in said reduced portion, a ring being attached to an end of the chain, and the means for detachably connecting the pull members of a set to a ring being detachably connected to the latter.

2. In a draft equalizer, a lengthwise adjustable draw bar formed of a series of endwise aligned detachably connected sections, the central section of the bar being formed with a pair of forwardly directed eyes for coupling pull members thereto, each of the other sections of the bar formed with a forwardly directed eye for coupling a pull member thereto, four spaced split bands encompassing said central section, a pair of spaced split bands encompassing each of the other sections of the bar, a pair of rearwardly disposed apertured spaced ears integral with each band at the split ends thereof, a rearwardly extending torsionally twisted apertured arm integral with one of said ears for connection to a ground-working device, means extending through the apertured ears of said bands for detachably clamping the bands on the bar sections.

3. In a draft equalizer, a skeleton clevis, a flexible element passing through and extending rearwardly from the clevis, a ring loosely mounted on each end of said element, a lengthwise adjustable draw bar formed of a series of detachably connected endwise aligned sections, a pair of pull members connected to the central section of the bar and each loosely connected to one of the said rings, a pair of skeleton coupling devices, each detachably and loosely connected to a ring, pull members loosely secured to certain others of the sections of the draw bar and loosely and removably connected to one of said devices, and pull members loosely connected to the others of the sections of the draw bar and loosely and rearwardly connected to the other of said devices, the said sections of the draw bars being provided with rearwardly extending means for connecting ground-working means therewith.

4. In a draft equalizer, a lengthwise adjustable draw bar formed of a central section and a set of outer sections extending from each end of the central section, said sections of said bar having coacting interengaging means for detachably connecting them together and for supporting them in endwise relation, a skeleton endless clevis having a reduced rear portion, a link chain extending rearwardly of the clevis and having its central link mounted in and extending through the rear portion of the clevis, said central link having one of its sides opposing the rear end of the reduced portion of the clevis, said reduced portion being of less width than said central link, a ring loosely connected to each end link of the chain, a pair of pull members for said central section, each being loosely attached to a ring, a pair of spaced skeleton coupling devices, each being loosely and detachably connected to a ring, spaced pull members for each set of outer sections formed with looped forward ends through which loosely extend one of said coupling devices.

ROY L. NOBLE.